United States Patent [19]

Tanamachi

[11] Patent Number: 5,689,153
[45] Date of Patent: Nov. 18, 1997

[54] ELECTRO-OPTICAL PLASMA DISPLAY DEVICE WITH ELECTRODE HAVING INSULATING LAYERS

[75] Inventor: Shoichi Tanamachi, Kanagawa, Japan

[73] Assignee: Sony Corporation, Tokyo, Japan

[21] Appl. No.: 538,361

[22] Filed: Oct. 3, 1995

[30] Foreign Application Priority Data

Oct. 5, 1994 [JP] Japan .................. 6-241072

[51] Int. Cl.$^6$ .................. H01J 17/49
[52] U.S. Cl. .................. 313/586; 313/492
[58] Field of Search .................. 313/581, 582, 313/584, 585, 586, 587, 491, 492, 268; 315/169.4

[56] References Cited

U.S. PATENT DOCUMENTS

| | | | |
|---|---|---|---|
| 5,306,984 | 4/1994 | Lee | 313/585 |
| 5,317,231 | 5/1994 | Lee | 313/491 |
| 5,351,144 | 9/1994 | Tanamachi | 315/169.4 |

Primary Examiner—Michael Horabik
Assistant Examiner—Michael Day
Attorney, Agent, or Firm—Hill, Steadman & Simpson

[57] ABSTRACT

A picture display device for driving a layer of an electro-optical material by exploiting a plasma for selecting a picture. The device includes a first substrate having a plurality of first electrodes arranged in parallel to one another, a second substrate having a plurality of parallel second electrodes extending perpendicularly to the first electrodes, a dielectric sheet provided between the first substrate and the second substrate, a plurality of barrier ribs provided on the second substrate to from a plurality of plasma channels between neighboring second electrodes, an electro-optical layer provided between the first substrate and the dielectric sheet, an ionizable gas sealed between the second substrate and the dielectric sheet, and a plurality of insulating layers formed on the second electrode, with each insulating layer being formed on a part of the second electrode. There is also disclosed a method for manufacturing the plasma display device.

12 Claims, 6 Drawing Sheets

ELECTRO-OPTICAL PLASMA DISPLAY DEVICE WITH ELECTRODE HAVING INSULATING LAYERS

BACKGROUND OF THE INVENTION

This invention relates to a picture display device for driving a layer of an electro-optical material by exploiting a plasma for selecting a picture.

As means for realizing a display with high resolution and high contrast, there is generally known a so-called active matrix addressed system of providing an active device, such as a transistor, for each display pixel, and driving the active device. However, since it is necessary in such case to provide a large number of semiconductor devices, such as thin-film transistors, there is raised a problem of production yield especially if the display is increased in size, with consequent increase in production cost.

For solving this problem, there is proposed a method of employing plasma discharge as an active device in place of the semiconductor device such as MOS transistor or thin-film transistor.

An illustrative picture display device for driving a liquid crystal by exploiting plasma discharge is briefly explained.

Figure 1:
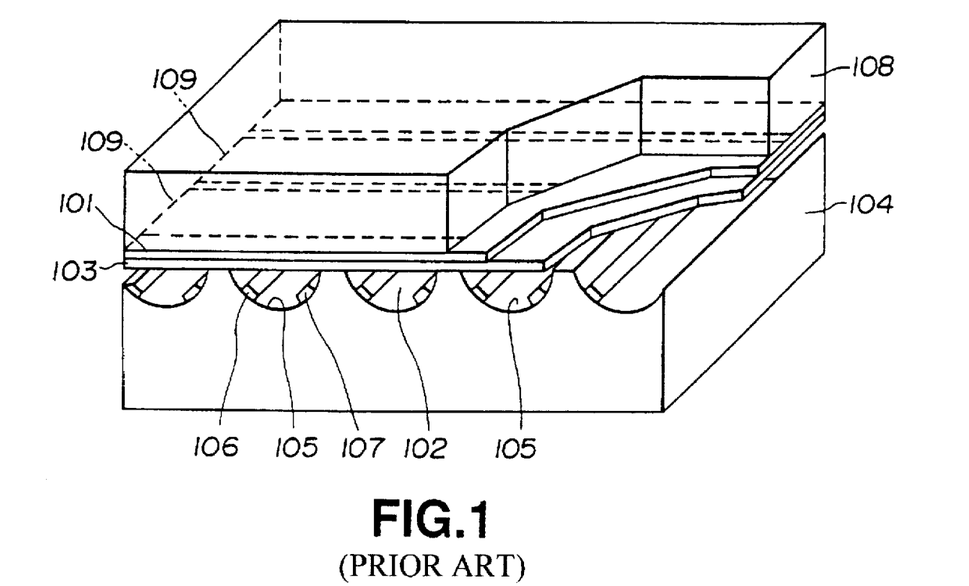
FIG. 1 is a schematic perspective view showing an illustrative picture display apparatus, with a portion being broken away.

The illustrative picture display device as shown in FIG. 1 includes a liquid crystal layer 101, as a layer of an electro-optical material, and a plasma chamber 102, as a discharge region in which plasma discharge occurs, and a dielectric sheet 103, as a thin dielectric film of e.g., glass, interposed between the liquid crystal layer 101 and the plasma chamber 102, as shown in FIG. 1.

The plasma chamber 102 is constituted by forming plural channels 105 on the glass substrate 104 in parallel to one another, and has an ionizable gas sealed therein. A pair of plasma electrodes 106, 107 are disposed within each channel 105 in parallel to each other so as to perform the role of an anode and a cathode for ionizing the gas within the plasma chamber 102 for producing plasma discharge.

The liquid crystal layer 101 is sandwiched between the dielectric sheet 103 and the transparent substrate 108, and a transparent electrode 109 is formed on the surface of the transparent substrate 108 facing the liquid crystal layer 101. The transparent electrode 109 is arranged perpendicularly to the plasma chamber 102 constituted by the channels 105, with an area of intersection of the transparent electrode 109 with the plasma chamber 102 constituting an area for each pixel.

With the above picture display device, by sequentially switching and scanning the plasma chamber 102 in which plasma discharge occurs, and by impressing the signal voltage across the transparent electrode 109 on the side of the liquid crystal layer 101 in a timed relation thereto, the signal voltage is held in each pixel for driving the liquid crystal layer 101.

Thus, each plasma chamber 102 represents one scanning line, and the discharge area is divided on the scanning line basis.

Although it may be contemplated that the above picture display device can be fabricated with a larger display area more easily than the device employing thin-film transistors, various problems are raised in putting the apparatus to practical application. For example, considerable difficulties are met in fabrication in forming the plasma chamber 102 for constituting the plasma chambers 102 in the glass substrate 104. In particular, it is extremely difficult to form the channels 105 to a high density. On the other hand, it is necessary during the fabrication to provide a pair of plasma electrodes 106, 107 in each channel 105. However, the etching process for this process is extremely complex such that it is extremely difficult to maintain a distance between the electrodes 106, 107 to a high accuracy.

Figure 2:
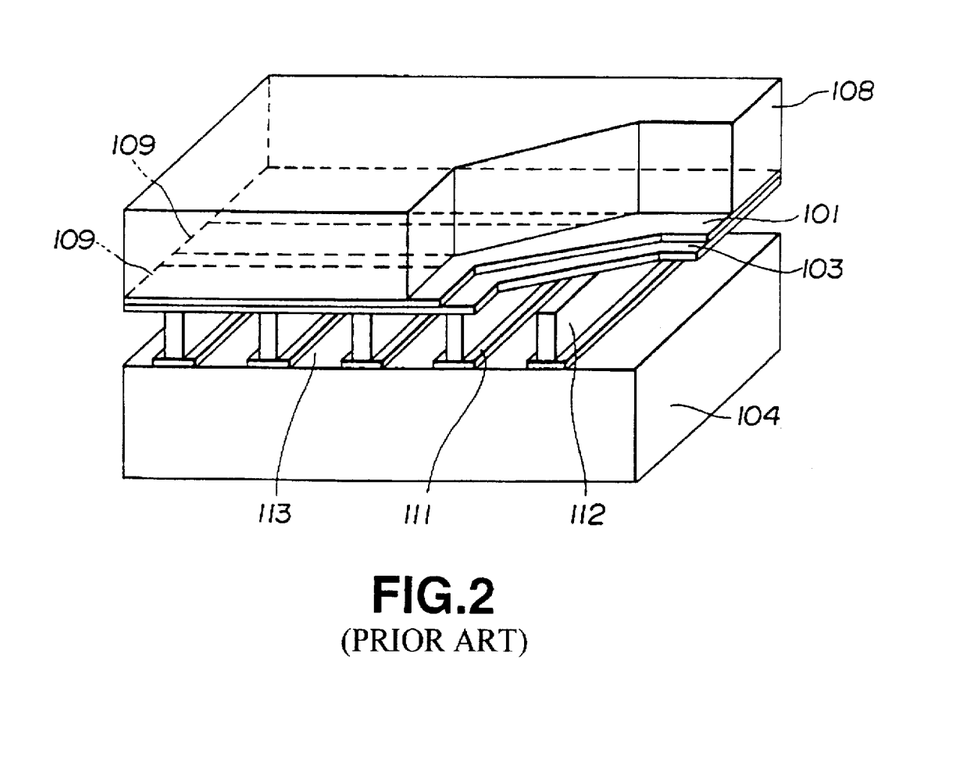
FIG. 2 is a schematic perspective view showing another illustrative picture display apparatus, with a portion being broken away.

Another illustrative picture display device, configured as shown in FIG. 2, is similar to the above-described picture display device. However, no channel such as channels 105 is formed in the glass substrate 104 and, in its stead, plural parallel stripe-shaped plasma electrodes 111 are formed on the glass substrate 104. On each plasma electrode 111 is formed a barrier rib 112 smaller in width than the plasma electrode 111. In addition, a dielectric sheet 103 is provided by means of these barrier ribs 112 for defining plasma chambers 113.

The plasma electrodes 111 alternately perform the role of cathodes and anodes, with the areas of intersection of the transparent electrodes 109 with the plasma chambers 103 defining the areas for respective pixels.

The above plasma electrode 111 is superior in productivity and workability since it can be easily formed on the flat glass substrate 104 by e.g., a screen printing method. There is an additional advantage that, when driving the picture display device, the role of the cathode and the anode can be alternatively switched so that the plasma electrodes 111 can be used simultaneously as the cathode and the anode, and hence the number of effective scanning lines can be increased to twice that of the picture display device shown in FIG. 1.

However, with the above picture display device, the material of the cathode electrode is scattered by the plasma discharge as a result of collisions with ions. Since the cathode electrode is electrically conductive, electrical shorting occurs in the above picture display device between neighboring pixels in each scanning line as a result of scattering of the electrode material. Thus there is a possibility that the neighboring pixels may be electrically connected to each other by an electrical resistance material. The result is that the injected electrical charges corresponding to respective pixels are averaged between the neighboring pixels. The stronger the collision of ions applied to the cathode electrode, the more briskly the electrical shorting between the neighboring pixels proceeds, such that the independent information cannot be held between the neighboring pixels, thus leading to significantly reduced service life of the picture display device.

SUMMARY OF THE INVENTION

It is therefore an object of the present invention to provide a picture display device having long service life and which can be fabricated easily.

In one aspect, the present invention provides a plasma addressed display device including a first substrate having a plurality of first electrodes arranged in parallel to one another, a second substrate having a plurality of parallel second electrodes extending perpendicularly to the first electrodes, a dielectric sheet provided between the first substrate and the second substrate, a plurality of barrier ribs provided on the second substrate to from a plurality of plasma channels between neighboring second electrodes, an electro-optical layer provided between the first substrate and the dielectric sheet, an ionizable gas sealed between the second substrate and the dielectric sheet, and a plurality of insulating layers formed on the second electrode. Each insulating layer is formed on a part of the second electrode.

Preferably, each insulating layer is formed on at least a part of each second electrode corresponding to a portion provided between the neighboring first electrodes.

Preferably, the second electrodes serve as anodes and cathodes, and the insulating layers are unified to the barrier ribs.

Preferably, the insulating layers and the barrier ribs are formed of the same material. The insulating layers contain a material selected from the group consisting of $SiO_2$ and glass.

Preferably, the first electrodes are formed of indium tin oxide.

Preferably, the second electrodes are formed of metal paste. The metal paste preferably contains nickel or aluminum.

Preferably, the protective layers are formed on the second electrodes. Also preferably, the gas is selected from the group consisting of Ne, Ar, He, Xe, Kr and mixtures thereof.

In another aspect, the present invention provides a method for producing a plasma addressed display device including the steps of forming a plurality of first electrodes on a first substrate parallel to one another, forming a plurality of second electrodes for extending perpendicularly to the first electrodes on a second substrate, forming a plurality of insulating layers on at least a part of each second electrode, providing a plurality of barrier ribs on the second substrate, forming a plasma chamber between a dielectric sheet and the second substrate, and providing an electro-optical layer between the first substrate and the plasma chamber. The step of forming second electrodes and the barrier ribs preferably uses a printing process.

With the picture display device of the present invention, since the barrier film formed of an insulating material is formed on at least a region of the second electrode intersected by an interstice of each first electrode, the electrode material may be prohibited from being scattered onto the area of the second electrode intersected by the interstice of each first electrode when the plasma discharge occurs and the second electrode is bombarded by ions. The result is that the insulating state is maintained between the neighboring pixels and hence the injected electrical charges may be prohibited from being averaged between the neighboring pixels.

It is seen from above that the picture display device according to the present invention is easy to manufacture and has a prolonged service life.

DESCRIPTION OF THE PREFERRED EMBODIMENTS

Referring to the drawings, several illustrative embodiment of the picture display apparatus of the present invention will be explained in detail.

Figure 3:
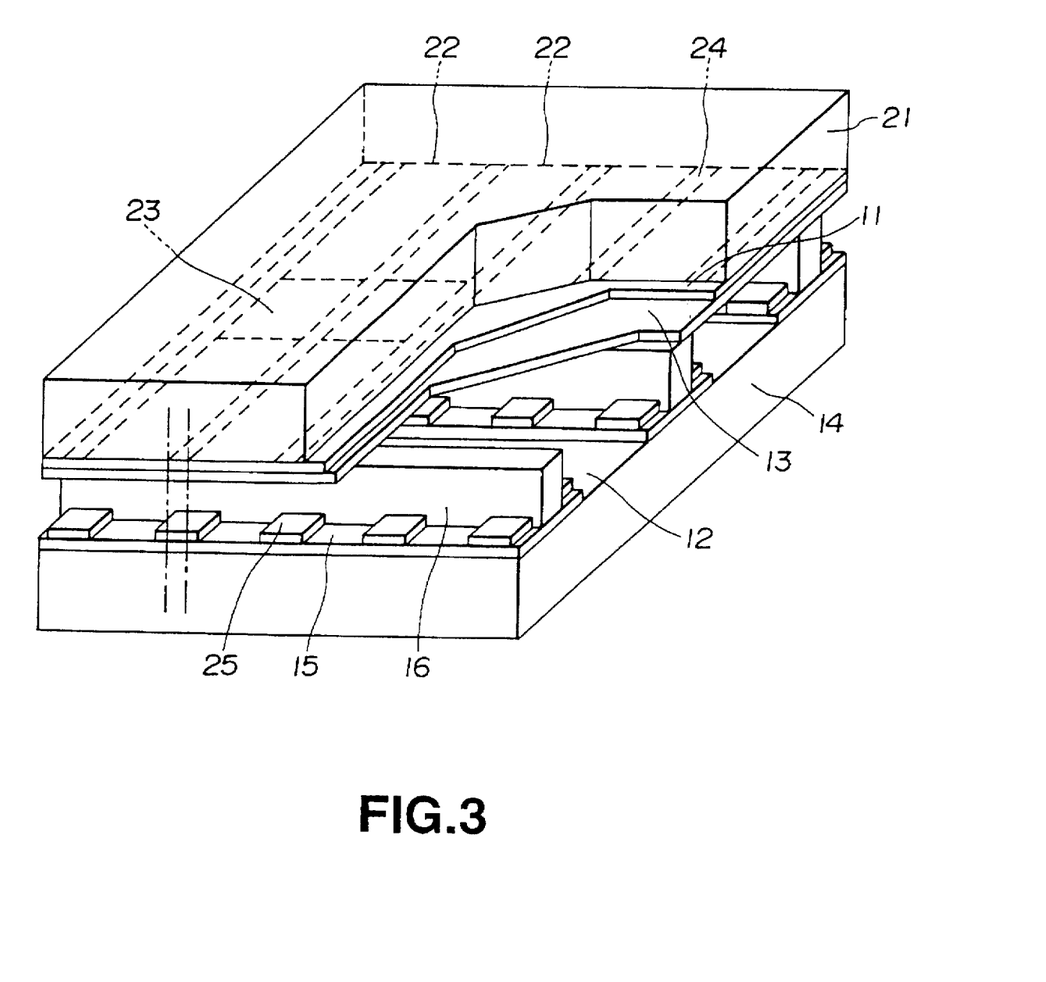
FIG. 3 is a schematic perspective view showing a picture display apparatus according to a first embodiment of the present invention, with a portion being broken away.

A first embodiment of the picture display apparatus as shown in FIG. 3 is now explained, in which a liquid crystal of an electro-optical material is driven by utilizing plasma discharge for effecting picture selection. The picture display apparatus is made up of a liquid crystal layer formed of an electro-optical material and a plasma channel 12 facing each other with a thin dielectric sheet 13 of a dielectric material, such as glass, in-between, as shown in FIG. 3. The plasma channel 12 serves as a discharge area in which plasma discharge occurs.

In the plasma channel 12, a plurality of parallel stripe-shaped plasma electrodes 15 of an electrically conductive material are arrayed on a glass substrate 14 with a pre-set distance from one another. The one ends of the plasma electrodes 15 are fitted alternately with terminals, not shown, for impressing an electrical voltage across the plasma electrodes 15.

On each plasma electrode 15 are formed barrier ribs 16 formed of an insulating material of a width narrower than that of the plasma electrode 15. The space between the glass substrate 14 and the dielectric sheet 13 is partitioned by the barrier ribs for defining plasma channels 12 within which ionizable gas is sealed. The neighboring plasma electrodes 15 play the role of the cathode and the anode, so that there exists a pair of electrodes, comprised of a cathode and an anode, in each plasma channel 12. In the present specification, the plasma chamber in its entirety and the plasma channels making up the plasma chamber in its entirety are depicted by the same reference numeral 12 for convenience in illustration.

On the dielectric sheet 13, there is mounted the liquid crystal layer 11 formed e.g., of a nematic liquid crystal. The liquid crystal layer 11 is sandwiched between orientation layers for adjusting the orientation of the liquid crystal and has its perimetrical portion supported by a liquid crystal seal. Between the lower surface of the transparent substrate 21, that is the surface of the substrate 21 facing the liquid crystal layer 11, a plurality of parallel stripe-shaped transparent electrodes 22 are formed with a pre-set interstice 24 from one another. These transparent electrodes 22 run at right angles to the plasma electrodes 15, so that the areas defined by intersection of the transparent electrodes 22 with the plasma electrodes 15 delimit areas for respective pixels.

Within the respective plasma channels 12, a insulating layer 25 formed of an insulating material is formed on each plasma electrode 15, that is on the anode and the cathode constituting the electrode pair. It is noted that the insulating layer 25 are formed on the portions of the plasma electrodes 15 intersecting the interstices 24 of the neighboring transparent electrodes 22 as shown by the vertical parallel broken lines, so that the barrier films are not provided in the regions of the respective pixels 23.

With the above-described picture display apparatus, the plasma channels 12 within which plasma discharge occurs are sequentially switched and scanned, while the signal voltage is impressed on the transparent electrodes 22 on the liquid crystal layer 11 in synchronism therewith for holding the signal voltage on each pixel for driving the liquid crystal layer 11.

Thus, each plasma channel 12 corresponds to one scanning line, and the discharge areas are defined on the scanning line basis.

Figure 4:
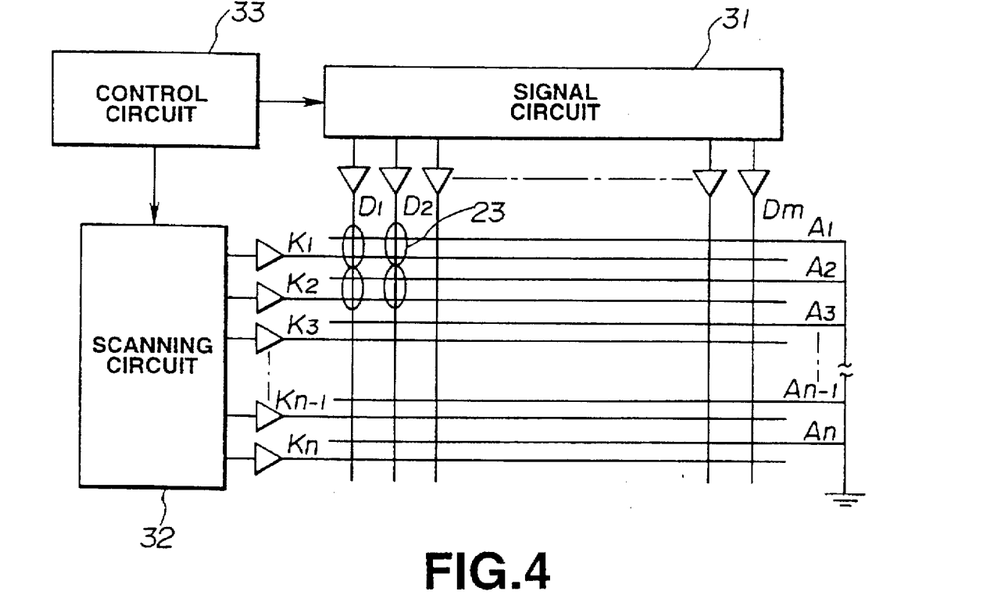
FIG. 4 is a schematic block diagram showing an illustrative driving circuit of the picture display apparatus.

The driving circuit of the picture display device is made up of a signal circuit 31, a scanning circuit 32 and a controlling circuit 33, as shown in FIG. 4. To the signal circuit 31, corresponding to the transparent electrode 22, a plurality of signal electrodes D1 to Dm are connected via a buffer, not shown.

To the scanning circuit 32 are connected cathode electrodes K1 to Kn via buffers, not shown. To the cathode electrodes are connected anode electrodes A1 to An. The cathode electrodes K1 to Kn and the anode electrodes A1 to An correspond to the cathodes and the anodes of the plasma electrode 15, respectively.

The controlling circuit 33 controls the signal circuit 31 and the scanning circuit 32 in synchronism with each other.

The cathode electrodes K1 to Kn are selected line-sequentially by the scanning circuit 32. If, for example, the cathode electrode K1 is selected, plasma discharge occurs between it and the neighboring anode electrode A1 to produce a local discharge area. This local discharge area constitutes a row scanning unit corresponding to the plasma channel 12. On the other hand, a pre-set driving electrical voltage is impressed across signal electrodes D1 to Dm in synchronism with the row scanning unit. Thus the signal electrodes D1 to Dm constitute column scanning units. The respective pixels 23 are defined at respective points of intersection between the column scanning units and the row scanning units.

Figure 5:
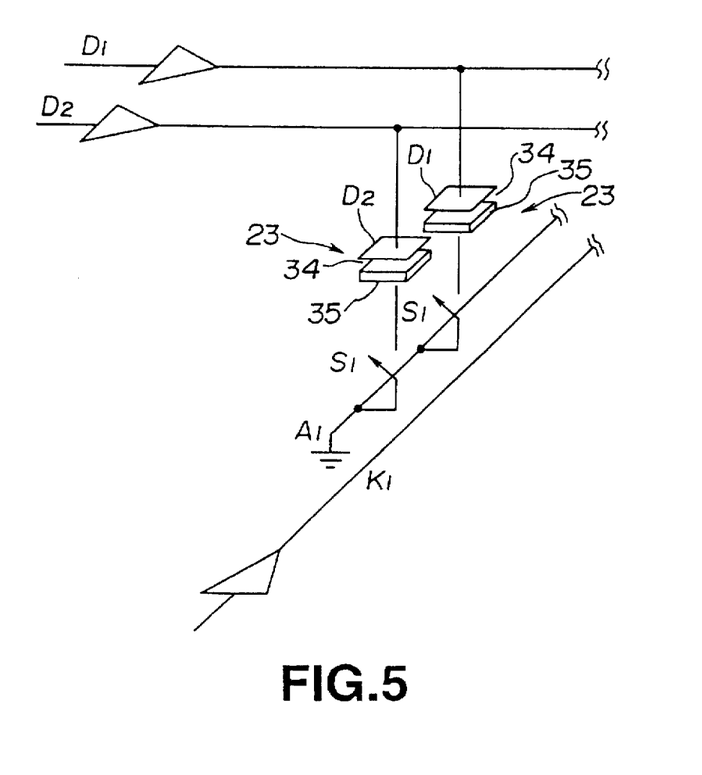
FIG. 5 illustrates two neighboring pixels of the picture display apparatus.

FIG. 5 shows only two neighboring pixels. For ease in understanding, only two signal electrodes D1, D2 and each one cathode electrode K1 and anode electrode A1 are shown. Each pixel 23 is comprised of a layered structure of the signal electrodes D1, D2, liquid crystal layer 34, dielectric sheet 35 and the plasma discharge area. The liquid crystal layer 34 and the dielectric sheet 35 correspond to the liquid crystal layer 11 and the dielectric sheet 13, respectively.

During plasma discharge, the plasma discharge area is connected to substantially the anode potential. If the driving voltage is impressed in this state to the pixel 23, electrical charges are injected into the liquid crystal layer 34 and the dielectric sheet 35. On termination of the plasma discharge, the plasma discharge area reverts to the insulated state, thus establishing a floating potential. The injected electrical charges are held by the pixels 2S and a so-called sample-and-hold operation is carried out. Since the signal electrodes D1, D2 are not provided between the respective pixels 23, the pixels are substantially insulated from one another and independent character of the pixels 23 is maintained. Since the plasma discharge area thus performs the role of a sampling switching element provided in the respective pixels 23, it is schematically depicted by a switching symbol S1.

On the other hand, the liquid crystal layer 34 and the dielectric sheet 35, sandwiched between the signal electrodes D1, D2 and the plasma discharge area, perform the role of a sampling capacitor. When the switching symbol S1 is in the conducting state, as a result of line-sequential scanning, the driving voltage is held by the sampling capacitor and the respective pixels Z3 are lighted or extinguished depending upon the driving voltage level. Even after the switching symbol S1 ceases to be electrically conductive, the picture display device executes its active matrix operation since the driving voltage is held on the sampling capacitor.

The plasma electrode 15 may be formed by e.g., a screen printing method. That is, a nickel layer may be printed on the glass substrate 14, using a nickel paste as a starting material. Alternatively, the nickel layer is formed on the glass substrate 14, using a printing screen and a nickel paste as a starting material, and a $LaB_6$ layer 15 may then be formed by an electro-deposition plating method for forming the plasma electrode 15, using powdered $LaB_6$ as a starting material. Comparable results may also be obtained on using an aluminum paste in place of the nickel paste.

The insulating layer 25 is similarly produced by printing an insulating paste containing glass or $SiO_2$ on the plasma electrode 15 printed with a pre-set printing screen. Subsequently, the barrier ribs 18 are also formed in a similar manner by printing an insulating paste of the same material as the insulating layer 25 on the plasma electrode 15 printed with a pre-set printing screen.

Figure 6:
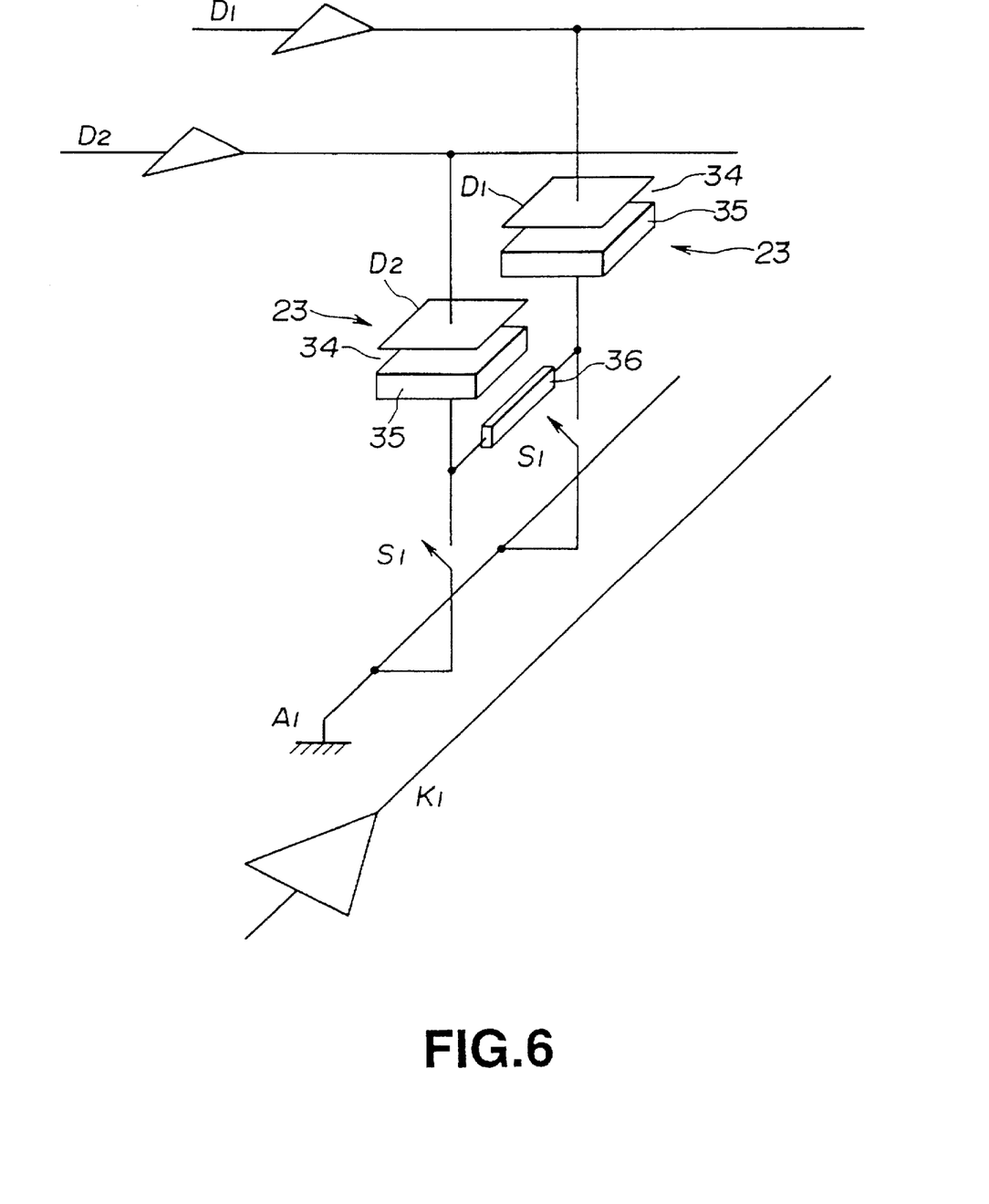
FIG. 6 illustrates the manner in which electrical shorting is produced between two neighboring pixels of the picture display apparatus by an electrode material scattered by collision of ion

With the picture display device of the illustrated first embodiment, since the insulating layer 25 of an insulating material is formed in an area of the plasma electrode 15 intersected by the interstice of each transparent electrode 22, the electrode material may be prohibited from being scattered onto the area of the plasma electrode 15 intersected by the interstice 24 of each transparent electrode if plasma discharge occurs and the plasma electrode 15 is bombarded by ions. Since the space between the neighboring pixels 23 is maintained in this manner in the insulated state, there is no possibility of electrical shorting being produced between the neighboring pixels 23, with the pixels being thus connected together by a resistance material 36. Thus the injected electrical charges may be prohibited from being averaged between the neighboring pixels 23.

A first modification of the above-described first embodiment is hereinafter explained. The picture display device of the present modification differs from the previously described embodiment as to the shape of the insulating layer 25 and is otherwise the same as the previous embodiment. The parts and components corresponding to those of the previous embodiment are depicted by the same numerals and the corresponding description is omitted for clarity.

Figure 7:
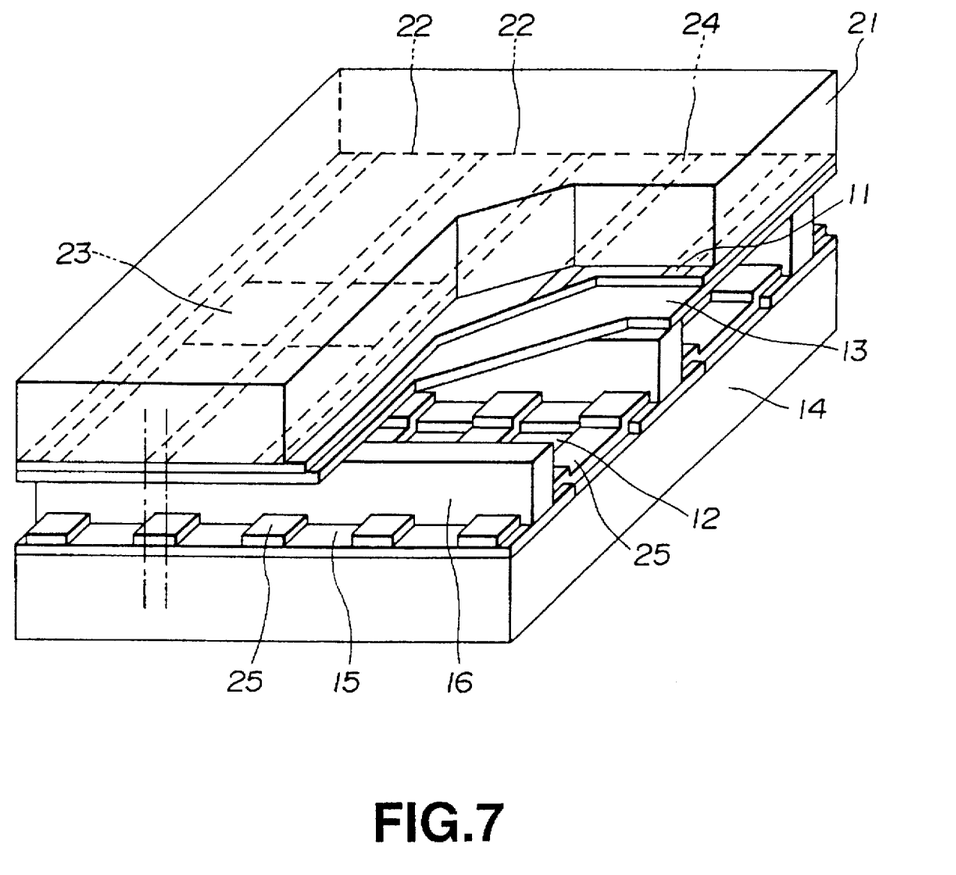
FIG. 7 is a schematic perspective view showing a picture display apparatus according to a modification of the first embodiment of the picture display apparatus, with a portion being broken away.

In the present first modification, the insulating layer 25 is formed not only on the portions of the plasma electrode 15 intersected by the interstice 24 of the neighboring transparent electrode 22, but also on the portions of the glass substrate 14 intersected by the interstice 24, so as to be unified to the barrier film formed on the plasma electrode, as shown in FIG. 7.

In the present first modification, similarly to the first embodiment, since the insulating layer 25 of an insulating material is formed on the portion of the plasma electrode 15 intersected by the interstice of each transparent electrode, the electrode material may be prohibited from being scattered onto the portion of the plasma electrode 15 intersected by the interstice 24 of each transparent electrode 22 when the plasma electrode 15 is subjected to ion bombardment. Since the insulated state of the space between the neighboring pixels 23 may be maintained in this manner, the injected electrical charges may be prohibited from being averaged in the region defined between the neighboring pixels 23.

A second modification of the above-described first embodiment is hereinafter explained. The picture display device of the present modification differs from the previously described embodiment as to the shape of the barrier film and the barrier ribs and is otherwise the same as the previous embodiment. The parts and components corresponding to those of the previous embodiment are depicted by the same numerals and hence the corresponding description is omitted for clarity.

Figure 8:
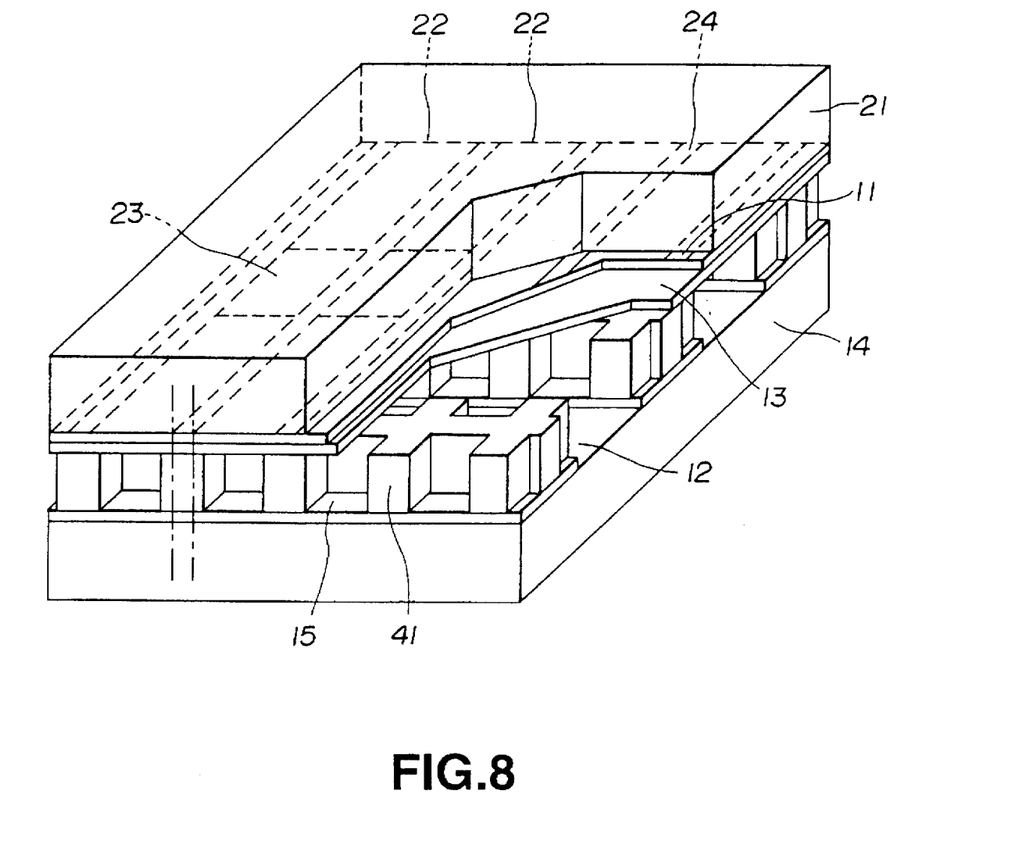
FIG. 8 is a schematic perspective view showing a picture display device according to a second embodiment of the present invention, with a portion being broken away.

With the present second modification of the plasma display device as shown in FIG. 8, a insulating layer 25 is formed on the plasma electrode 15 to the same height as the barrier rib 16, so as to be unified to the barrier rib 16, for forming a insulating layer 41, as shown in FIG. 8. It is noted that the area of the insulating layer 41 corresponding to the insulating layer 25 is formed on the portion of the plasma electrode 15 intersected by the interstice 24 of the neighboring transparent electrode 22, as in the previous first embodiment.

With the present second modification, since the insulating layer 41 formed of an insulating material is formed on the portion of the plasma electrode 15 intersected by the interstice of each transparent electrode, the electrode material may be prohibited from being scattered onto the area of the plasma electrode 15 intersected by the interstice 24 of each transparent electrode when the plasma discharge occurs and the plasma electrode 15 is bombarded by ions. The result is that the insulated state between the neighboring pixels 23 may be maintained and hence the injected charges may be prohibited from being averaged between the neighboring pixels 23.

In addition, with the present second embodiment, the insulating layer 41 is unified with the barrier rib 16. Thus, if the picture display apparatus is to be formed by printing by e.g., the screen printing method, the plasma electrodes 15 are first printed on the glass substrate 14 using a printing screen, and the insulating layers 41 and the barrier ribs 16 are then simultaneously formed by printing on the plasma electrode 15 using the same printing screen. That is, the number of the printing screens employed is one less than that used for the first embodiment, thus enabling the number of the production process steps to be diminished.

Although the foregoing description has been made with reference to preferred embodiments of the present invention, these embodiments are merely illustrative and the types of the material, shape or size of the components may be optionally selected within the scope of the present invention.

Although the screen printing method is used in the above embodiments in connection with the method of fabricating the apparatus, this is not limitative of the present invention. For example, the photolithographic method may also be employed, in which an insulating material such as $SiO_2$ is formed by sputtering or vacuum deposition on the plasma electrode 15 formed on the glass substrate 14 for shielding the plasma electrode and subsequently the required portion of the plasma electrode 15 is exposed by etching for forming the barrier film and the barrier ribs.

What is claimed is:

1. A plasma addressed display device, comprising:
   a first substrate having a plurality of stripe-shaped first electrodes arranged in parallel to one another so as to form stripe-shaped interstices between neighboring ones of said first electrodes;
   a second substrate having a plurality of parallel stripe-shaped second electrodes extending perpendicularly to said first electrodes;
   a dielectric sheet provided between the first substrate and the second substrate,
   a plurality of barrier ribs provided on the second substrate substantially parallel to said second electrodes to form a plurality of plasma channels between neighboring ones of said second electrodes;
   an electro-optical layer provided between the first substrate and the dielectric sheet;
   an ionizable gas sealed between the second substrate and the dielectric sheet; and
   a plurality of insulating layers formed on the second electrode, each insulating layer being formed on a part of the second electrode at a position opposed interstices between neighboring ones of said first electrodes.

2. The plasma addressed display device as recited in claim 1, wherein said second electrodes serve as anodes and cathodes.

3. The plasma addressed display device as recited in claim 1, wherein said insulating layers are unified to the barrier ribs.

4. The plasma addressed display device as recited in claim 1, wherein said insulating layers and the barrier ribs are formed of the same material.

5. The plasma addressed display device as recited in claim 1, wherein said insulating layers contain a material selected from the group consisting of $SiO_2$ and glass.

6. The plasma addressed display device as recited in claim 1, wherein said first electrodes are formed of indium tin oxide.

7. The plasma addressed display device as recited in claim 1, wherein said second electrodes are formed of metal paste.

8. The plasma addressed display device as recited in claim 7, wherein said metal paste contains nickel.

9. The plasma addressed display device as recited in claim 1, wherein said electro-optical layer is a liquid crystal layer.

10. The plasma addressed display device as recited in claim 1, wherein said gas is selected from the group consisting of Ne, Ar, He, Xe, Kr and mixtures thereof.

11. A plasma addressed display device as claimed in claim 1, wherein said insulating layers include portions between said second electrodes at said interstices, said portions between said second electrodes being on said second substrate.

12. A plasma addressed display device as claimed in claim 1, wherein said insulating layers are of a substantially same height as said barrier ribs.

* * * * *